United States Patent [19]

Dujari et al.

[11] Patent Number: 5,698,658
[45] Date of Patent: Dec. 16, 1997

[54] LINEAR VERY HIGH MOLECULAR WEIGHT POLYAMIDES AND PROCESS FOR PRODUCING THEM

[75] Inventors: Ramdas Dujari, Seaford; Daniel Gregory Tynan, Wilmington, both of Del.

[73] Assignee: E. I. Du Pont de Nemours and Company, Wilmington, Del.

[21] Appl. No.: 657,745

[22] Filed: May 31, 1996

[51] Int. Cl.⁶ ..................................................... C08G 69/48
[52] U.S. Cl. .......................... 528/310; 528/313; 528/322; 528/335; 528/336; 528/337; 528/487; 525/419; 525/420
[58] Field of Search ..................... 528/487, 313, 528/310, 322, 332, 335, 336, 337; 525/419, 420

[56] References Cited

U.S. PATENT DOCUMENTS

| | | | |
|---|---|---|---|
| 3,365,428 | 1/1968 | Wujciak | 525/420 |
| 3,509,107 | 4/1970 | Brignac | 525/420 |
| 4,390,667 | 6/1983 | Aharoni et al. | 525/420 |
| 4,433,116 | 2/1984 | Largman et al. | 525/420 |
| 4,912,175 | 3/1990 | Wheland et al. | 525/420 |
| 4,966,949 | 10/1990 | Wheland | 525/420 |

OTHER PUBLICATIONS

Srinivasan et al., Solid–State Polymerization Vis–a–Vis Fiber Formation of Step–Growth Polymers. I. Results from a Study of Nylon 66, *Journal of Applied Polymer Science*, 53, 1731–1743, 1994, the month of publication is not available.

*Primary Examiner*—Jeffrey C. Mullis
*Assistant Examiner*—P. Hampton-Hightower

[57] ABSTRACT

A linear polyamide having a weight average molecular weight above 200,000 is made by heating a lower molecular weight molten polyamide with thorough mixing at a temperature of about 265°–300° C. for at least 5 minutes while an inert gas is swept gently through the reactor, the increase of molecular weight of the polyamide being catalyzed by a particular phosphinic acid derivative.

10 Claims, No Drawings

LINEAR VERY HIGH MOLECULAR WEIGHT POLYAMIDES AND PROCESS FOR PRODUCING THEM

FIELD OF THE INVENTION

This invention relates to linear very high molecular weight polyamides and to a process for producing them from lower molecular weight polyamides. The high molecular weight polyamides of this invention have utility in the manufacture of high strength fibers and engineered parts.

BACKGROUND OF THE INVENTION

Current commercial polyamides such as, e.g., nylon 6,6, have fairly low molecular weights. Thus the number average molecular weight, $M_n$, is in the range of about 10,000–20,000, while weight average molecular weight, $M_w$, is about 20,000–50,000. Such materials are presently employed in the manufacture of textile and industrial fibers and of molded engineering parts.

It has long been recognized that increasing the molecular weight to a significantly higher level, while preserving high degree of linearity, a goal not heretofore attainable, would likely make available an entirely new family of melt-processable polyamides suitable for highly advanced fibers and engineered parts, exhibiting higher toughness and strength than currently available. However, prior to the present invention, such linear, high molecular weight polyamides were not known; nor was known a process capable of producing them.

In two U.S. patents known to the inventors the molecular weight of polyamide products is not reported but their relative viscosities, RV, are reported. RV is a convenient value, employed in the nylon business for evaluating molecular weights for control purposes. It may be of more limited value when discussing molecular weights well beyond the normal range. However, for purposes of comparison, the reported prior art RV values can be converted to approximate weight average molecular weights by employing the formula, known in the art, of $M_w = 2492.5 \times (RV^{0.68046})$.

U.S. Pat. No. 4,912,175 (to Miller et al) discloses a process for increasing the molecular weight of polyamides, especially of nylon 6,6, by heating at 265°–300° C. in the presence of a phosphonic or phosphinic acid catalyst or esters thereof, to increase the rate of "amidation" (molecular weight increase). The resultant products exhibit a "desirably low degree of branching". The operating temperaure is above the melting temperature of nylon 6,6, but, in the alternative, can be below the melting temperature, preferably 170°–245° C. All of the examples were run on a scale of a few grams in a sealed "thin film polymerizer". Polymerization was performed at 280° C. under steam at the subatmospheric pressure of 100 torr (13.3 kPa). Catalyst concentration was 10 mmoles per kg of nylon. Reaction time was 5 minutes. The starting material had a weight average molecular weight of ca. 38,000 (RV=54). Resultant polymer had a weight-average molecular weight as high as ca. 113,000 (RV=271). Branching was determined by a method that is now considered to be out of date to be on the order of 2.5 mmoles of branches per kg of polymer, said to be unusually low.

U.S. Pat. No. 4,966,949 (to Wheland) employs substituted phenylphosphonic acid catalysts in substantially the same manner as described in the Miller et al. patent, except that the starting material had a weight average molecular weight of ca. 31,000 (RV=40). Resultant polymer had a weight average molecular weight of ca. 182,000 (RV=548). Wheland does not say whether the final polyamide product was linear.

Srinivasan et at., *Journal of Applied Polymer Science*, 53, 1731, discloses nylon 6,6 having a viscosity average molecular weight of up to ca. 280,000, obtained by solid phase polymerization of preformed lower molecular weight nylon 6,6 articles such as fibers. The method used by the authors to determine the molecular weight is known in the art to be unsuitable for high molecular weight polymers; if determined correctly, the molecular weight would be expected to be lower. In addition, the data presented do not permit one to determine the number average molecular weight of the nylon. Further, and more importantly, there is not much information on the linearity of the nylon. The authors refer to "tie chains", which suggests a significant degree of molecular branching.

SUMMARY OF THE INVENTION

This invention provides a substantially linear polyamide having a weight average molecular weight greater than 200,000 and a number average molecular weight greater than 25,000, preferably at least 40,000, as determined in each case by size exclusion chromatography (SEC); and a value g', corresponding to the ratio of the intrinsic viscosity to that of a linear standard, of at least 0.95, as determined at a molecular weight of 100,000, indicating the absence of detectable long-chain branching.

This invention further provides a process for producing such polyamides, the process comprising (1) charging a polymerization reactor capable of efficient mixing with a lower molecular weight polyamide and at least 0.5 mmole per kg of polymer of a catalyst of the formula

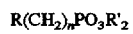

where R is 2-pyridyl or $NH_2$—; n=2, 3, or 4; and R' is a $C_1$–$C_{10}$ alkyl or hydrogen;

[2-(2'pyridyl)ethyl]phosphonic acid (PEPA), being preferred;

(2) heating the charge to 265°–300° C., preferably 270°–290° C., to cause the charge to melt;

(3) thoroughly mixing the molten polymer for at least about 5 minutes while sweeping the reactor with an inert gas; and (4) discharging the polyamide from the reactor.

DETAILED DESCRIPTION OF THE INVENTION

A preferred apparatus for carrying out the process of this invention is the melt-film polymerizer described in U.S. Pat. No. 4,556,324 (to Tynan)), which is herein incorporated by reference. This apparatus affords a high degree of mixing, where an extensive area of melt film is created and its surface is continuously renewed; it allows longer residence times than are usually available in extruders but still is suitable in a continuous process, which is preferred.

The polyamides most suitable as the starting materials in the process of this invention are condensation homopolymers and copolymers made from diamines and dicarboxylic acids or their diesters according to known processes. Typical such polyamides are nylon 6,6; nylon 6,12; and copolymers of hexamethylenediammonium adipate with 2-methyl pentamethylenediamine and sulfoisophthalic acid, all having a weight average molecular weight in the range of about 20,000 to 50,000. Sulfoisophthalic acid is the commercial name of 3,5-dicarboxybenzenesulfonic acid, which is used in the form of its sodium sulfonate salt.

The starting polymer and the catalyst, with which the polyamide can be premixed, are introduced into the melt-film polymerizer, which has been filled with an inert gas such as, for example, nitrogen and preheated to the required temperature. After the polyamide charge has melted, stirring is begun, accompanied by a gentle flow of inert gas, preferably nitrogen. This is normally done in an open system at a nitrogen pressure slightly above atmospheric. In principle, this process also could be carried out at a reduced pressure, say 40–55 kPa, but the efficacy of water removal at normal pressure with a nitrogen sweep is higher than at a reduced pressure. Further, at very low pressures, i.e., approaching full vacuum, molten nylon may tend to foam, which is undesirable.

Often, 0.5 mmole of the preferred catalyst (PEPA) per kg of starting polymer is sufficient, although at least about 1 mmole per kg of polyamide is preferred, and at least 2 mmoles per kg of polyamide is especially recommended. Amounts of PEPA as high as 10 mmoles per kg of polyamide have been found operable. While the optimum amount of catalyst can be readily determined experimentally, no benefit is obtained by increasing it much further. At least about 5 minutes of reaction time after the starting polyamide melts is sufficient in most cases; longer reaction times may improve polymer homogeneity, resulting in a low $M_w/M_n$ ratio, while leading to a further increase of molecular weight. Longer reaction times are especially recommended when the amount of catalyst is less than about 1 mmole per kg of polyamide.

As shown in the examples below, longer reaction/mixing time improved polyamide homogeneity at any catalyst level. The highest molecular weight was obtained at the highest catalyst level and the longest mixing time; surprisingly, the highest molecular weight polyamide also was the most homogeneous. However, excessive residence time may lead to polymer degradation, particularly as the melt viscosity increases with increasing molecular weight.

This invention is now illustrated by the following representative examples of certain preferred embodiments thereof. All parts, proportions, and percentages are by weight unless otherwise indicated.

The analytical techniques are described at the end of the experimental part.

EXAMPLES

In the following examples, a small melt-film polymerizer of the type described in U.S. Pat. No. 4,556,324 was employed. The apparatus was heated to 285° C. It was evacuated and purged with nitrogen several times to exclude air. Twenty grams of a polyamide copolymer made from 3–3.25% of 2-methyl pentamethylene diamine, 1.25% of sulfoisophthalic acid, and 95.25–95.5% of hexamethylene-diammonium adipate, together with 12 parts per million of Mn in the form of manganese hypophosphite, was premixed with the indicated amounts of PEPA catalyst and introduced into the heated, nitrogen-filled polymerizer. The weight average molecular weight of the starting polyamide was about 29,000 (RV=38). When the polyamide had melted, mixing was begun and the reaction was run the length of time indicated in Table 1 below.

The resultant polymer was analyzed by size exclusion chromatography and by end group analysis.

TABLE 1

| Example No. | PEPA mmoles/kg | Reaction time (min) | $M_w$ (× 10$^{-3}$) | $M_n$ | $M_w/M_n$ |
|---|---|---|---|---|---|
| 1 | 1.0 | 2 | 132 | 17 | 7.6 |
| 2 | 1.0 | 5 | 211 | 29 | 7.2 |
| 3 | 1.5 | 2 | 132 | 16 | 8.1 |
| 4 | 1.5 | 5 | 222 | 32 | 6.9 |
| 5 | 2.0 | 2 | 172 | 19 | 9.2 |
| 6 | 2.0 | 5 | 261 | 57 | 4.6 |

This table shows that molecular weights well in excess of 200,000 were obtained for each level of catalyst when the reaction times were 5 minutes but were always below 200,000 when the reaction times were 2 minutes.

Molecular weight was determined using size exclusion chromatography (SEC), as described by W. W. Yao et al. in *Modern Size Exclusion Liquid Chromatography*, John Wiley and Sons, 1979. Employed for the measurements described below was, a Waters high pressure liquid chromatograph, model HPLC 150, available from Waters Corp., Milford, Mass., equipped with one Shodex GPC HFIP800P column followed by two Shodex HFIP80M columns, available from Waters Corp. Detectors included a Wyatt model DAWN F multi-angle laser light scattering detector, available from Wyatt Technology Corp., Santa Barbara, Calif., a Viscotek model 150R flow through viscometer available from Viscotek Corporation, Houston, Tex., and a Waters 150C refractometer available from Waters Corp. The specimens were dissolved in hexafluoroisopropanol with a small percentage of sodium trifluoroacetate.

Linearity, or, alternatively, the degree of branching, of polymer molecules can be estimated by comparison of the intrinsic viscosities of test samples with those of linear standards in the same molecular weight range. For the very high molecular weight samples of the instant invention, however, no corresponding linear standards exist. Therefore, the degree of branching of the specific polymers of this invention was estimated by extrapolating to high molecular weight relationships developed for the lower molecular weight polyamides commonly found in commerce.

The procedure is based upon the Mark-Houwink equation, which describes the relationship between molecular weight and intrinsic viscosity, h, as $$[h] = K \cdot M^a$$

where "K" is the Mark-Houwink constant; "a" is the Mark-Houwink constant-exponent; and M is the weight average molecular weight. The Mark-Houwink equation is well-known; see, for example, F. W. Billmeyer, *Textbook of Polymer Science*, 3rd ed., Chapter 8, John Wiley and Sons, Inc., New York, 1984. The Mark-Houwink parameters are determined from SEC data, obtained as described above, for the high molecular weight polymers of the instant invention and the lower molecular weight linear standards. The branching factor g', as described in Ouano, A. C., E. M. Barrall, and J. J. F. Johnson. in the section entitled *Gel Permeation Chromatography, in Polymer Molecular Weight*, P. E. Slade, Editor, Part II, Chapter 6, pages 287–378. Marcel Dekker, Inc., New York, 1975, is determined from the ratio of the intrinsic viscosity of the test sample to that of the linear standard over the same range of molecular weights.

In the determinations described below, the average results obtained from three linear standards were employed; while data for each polymer of the present invention represents the average of two determinations.

In nylon 6,6, g' values greater than 0.95 are considered to represent the absence of detectable long-chain branching. As shown in the Table 2, below, none of the polymers of this invention showed any detectable levels of long-chain branching, calculated at a molecular weight of 100,000 g/mole.

TABLE 2

Mark-Houwink Coefficients as Determined at 100,000 MW

| Sample | Log K  | a     | [h]   | g'   | Average g' |
|--------|--------|-------|-------|------|------------|
| Std A  | −2.755 | 0.638 | 2.723 | 0.97 |            |
| Std B  | −2.943 | 0.683 | 2.965 | 1.06 |            |
| Std C  | −2.755 | 0.638 | 2.723 | 0.97 |            |
| Ex. 1/1 | −2.763 | 0.644 | 2.864 | 1.02 | 1.01     |
| Ex. 1/2 | −2.636 | 0.617 | 2.812 | 1.00 |           |
| Ex. 2/1 | −2.769 | 0.641 | 2.729 | 0.97 | 0.97     |
| Ex. 2/2 | −2.783 | 0.643 | 2.704 | 0.96 |           |
| Ex. 3/1 | −2.859 | 0.662 | 2.825 | 1.01 | 1.02     |
| Ex. 3/2 | −2.630 | 0.618 | 2.884 | 1.03 |           |
| Ex. 4/1 | −2.561 | 0.596 | 2.624 | 0.94 | 0.98     |
| Ex. 4/2 | −2.487 | 0.589 | 2.871 | 1.02 |           |
| Ex. 5/1 | −2.714 | 0.632 | 2.793 | 1.00 | 1.01     |
| Ex. 5/2 | −2.666 | 0.624 | 2.844 | 1.01 |           |
| Ex. 6/1 | −2.462 | 0.588 | 3.006 | 1.07 | 1.07     |
| Ex. 6/2 | −2.405 | 0.574 | 2.985 | 1.06 |           |

We claim:

1. A substantially linear polyamide having a weight average molecular weight greater than 200,000 and a number average molecular weight greater than 25,000, as determined in each case by size exclusion chromatography and a value g', corresponding to the ratio of the intrinsic viscosity to that of a linear standard, of at least 0.95, as determined at a molecular weight of 100,000, indicating the absence of detectable long-chain branching.

2. A polyamide of claim 1 which is nylon 6,6.

3. A polyamide of claim 1, which is a copolymer of hexamethylenediammonium adipate with 2-methyl pentmethylene diamine and 3,5-diacarboxybenzenesulfonic acid.

4. A polyamide of claim 1 which has a number average molecular weight of at least 40,000.

5. A process for producing a substantially linear polyamide having a weight average molecular weight greater than 200,000 and a number average molecular weight greater than 25,000, as determined in each case by size exclusion chromatography and a value g', corresponding to the ratio of the intrinsic viscosity to that of a linear standard, of at least 0.95, as determined at a molecular weight of 100,000, indicating the absence of detectable long-chain branching; said process comprising:

(1) charging a polymerization reactor, said reactor having a mixing means, with a lower molecular weight polyamide and at least 0.5 mmole per kg of polymer of a catalyst of the formula $$R(CH_2)_nPO_3R'_2$$

where R is 2-pyridyl or $NH_2$—; n=2, 3, or 4; and R' is a $C_1$–$C_{10}$ alkyl or hydrogen;

(2) heating the charge to 265°–300° C., to cause the charge to melt;

(3) thoroughly mixing the molten polymer for at least about 5 minutes while sweeping the reactor with an inert gas; and (4) discharging the polyamide from the reactor.

6. A process of claim 5, wherein the catalyst comprises [2-(2'pyridyl)ethyl]phosphonic acid.

7. A process of claim 5 wherein the reactor temperature is maintained at about 270°–290° C.

8. A process of claim 5 wherein the amount of catalyst is at least 1 mmole per kg of polyamide.

9. A process of claim 8 wherein the amount of catalyst is at least 2 mmoles per kg of polyamide.

10. The process of claim 5 wherein the amount of catalyst is 0.5–10 mmoles per kg of polyamide.

* * * * *